(12) United States Patent
Dunn et al.

(10) Patent No.: US 6,181,070 B1
(45) Date of Patent: Jan. 30, 2001

(54) METHOD FOR COOLING A LAMP BACKLIGHTING MODULE OF A LIQUID CRYSTAL DISPLAY

(75) Inventors: William R. Dunn, Alpharetta; James M. Brannen, Lawrenceville, both of GA (US)

(73) Assignees: Universal Avionics Systems Corporation - Instrument Division, Norcross, GA (US); L-3 Communications Corporation, New York, NY (US)

( * ) Notice: Under 35 U.S.C. 154(b), the term of this patent shall be extended for 0 days.

(21) Appl. No.: 09/251,889

(22) Filed: Feb. 19, 1999

Related U.S. Application Data

(60) Provisional application No. 60/075,240, filed on Feb. 19, 1998.

(51) Int. Cl.[7] ............................. G09G 3/36; G03G 21/00
(52) U.S. Cl. .................. 315/117; 315/112; 315/309; 345/101; 345/102
(58) Field of Search ................................ 315/112, 117, 315/149, 157, 158, 159, 224, 225, 309; 345/1, 2, 3, 101, 102

(56) References Cited

U.S. PATENT DOCUMENTS

| | | | |
|---|---|---|---|
| 3,971,968 | 7/1976 | Bachmann et al. | 315/108 |
| 4,518,895 | * 5/1985 | Lehman | 315/117 |
| 4,529,912 | * 7/1985 | Northrup et al. | 315/117 |
| 4,533,853 | * 8/1985 | Hammond et al. | 315/117 |
| 4,763,992 | 8/1988 | Takada et al. | 349/72 |
| 4,907,859 | 3/1990 | Takada et al. | 349/161 |
| 4,978,890 | * 12/1990 | Sekiguchi et al. | 315/117 |
| 5,059,860 | 10/1991 | Sato et al. | 313/488 |
| 5,078,039 | 1/1992 | Tulk et al. | 84/464 R |
| 5,136,397 | 8/1992 | Miyashita | 348/748 |
| 5,508,782 | * 4/1996 | Koh et al. | 315/309 |
| 5,907,222 | 5/1999 | Lengyel et al. | 315/158 |

* cited by examiner

*Primary Examiner*—David Vu
*Assistant Examiner*—Wilson Lee
(74) *Attorney, Agent, or Firm*—Standley & Gilcrest LLP

(57) ABSTRACT

The present invention is a method for cooling a lamp backlighting module of a liquid crystal display. A preferred method of the present invention begins by providing a predetermined power input to a lamp. As power is provided to the lamp, the temperature of the lamp is monitored. When the temperature of the lamp rises to a first predetermined temperature, one or more fans are turned on which are adapted to dissipate the heat generated by the lamp. After the fan(s) cool the lamp to a second, lower predetermined temperature, the fan(s) are turned off. By using a fan to dissipate heat generated by a lamp backlighting module, the present invention may maintain the temperature of the lamp within a desired range. As a result, the present invention preferably increases the reliability and performance of the liquid crystal display. In particular, a preferred embodiment of the present invention minimizes the power necessary to achieve optimal luminance, and it enables the lamp to constantly produce optimal luminance for a constant power input.

7 Claims, 4 Drawing Sheets

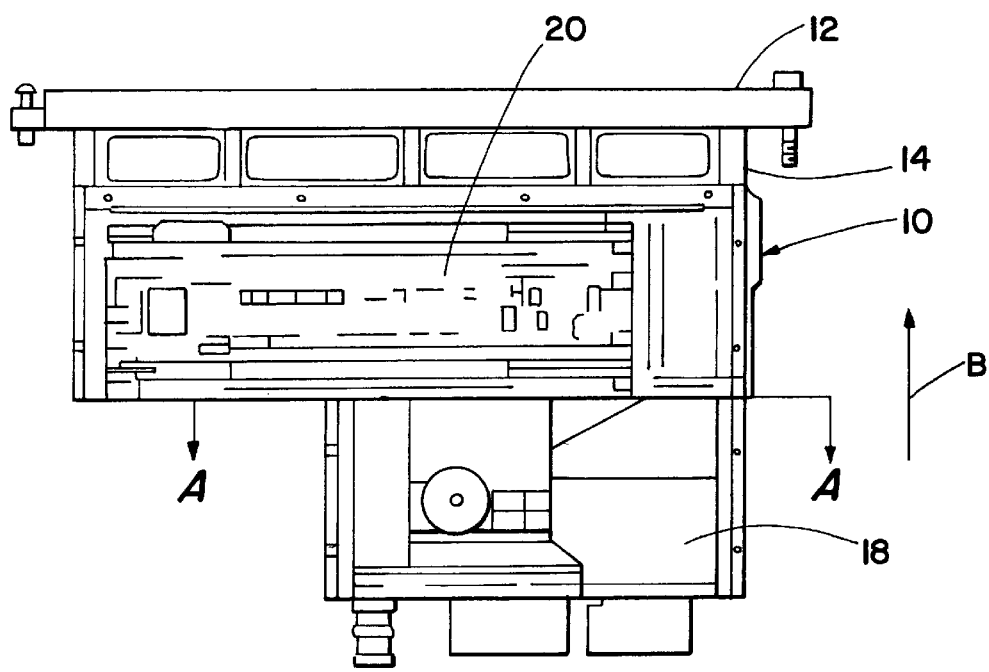
Fig. 5
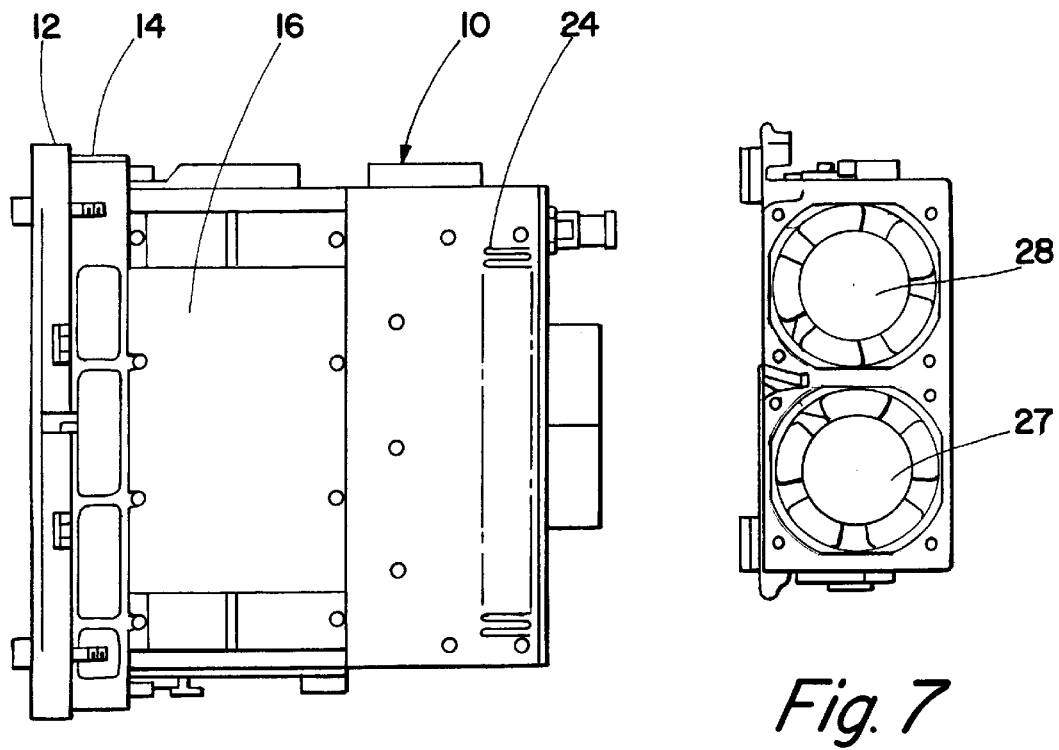
Fig. 6
Fig. 7

METHOD FOR COOLING A LAMP BACKLIGHTING MODULE OF A LIQUID CRYSTAL DISPLAY

This application claims the benefit of U.S. Provisional Application Ser. No. 60/075,240, filed Feb. 19, 1998.

BACKGROUND AND SUMMARY OF THE INVENTION

The present invention relates generally to a method for cooling a lamp, and more particularly, to a method for cooling a lamp backlighting module of a liquid crystal display. Liquid crystal displays are widely used as displays for computers, calculators, and security systems. In addition, liquid crystal displays have been particularly useful in avionic instrumentation display units.

In general, liquid crystal displays function by controlling the transmissibility of light through a liquid crystalline material. The transmissibility of light through the liquid crystalline material is controlled by manipulating the orientation of the liquid crystalline material. The orientation of the liquid crystalline material may be adjusted by applying a voltage across the liquid crystalline material. Consequently, the light which is transmitted through a layer of liquid crystalline material may be controlled by changing the voltage.

The liquid crystalline material is not self-illuminating. The liquid crystal display matrix is backlighted such that light may be transmitted through the liquid crystalline material. Backlighting is commonly provided by a lamp backlighting module which is adapted to transmit light through the liquid crystalline material. In addition, a diffuser may be located between the liquid crystal display matrix and the lamp in order to blend the light or to facilitate viewing the display from a variety of angles.

Power must be supplied to the lamp in order to produce light. As a by-product of producing light, the lamp also generates heat. The heat generated by the lamp may compromise the reliability and performance of the lamp backlighting module and the liquid crystal display. In particular, excessive heat diminishes a lamp's luminance for a given power input. Moreover, excessive heat reduces the reliability of the lamp and potentially presents a fire hazard.

There are several different embodiments of lamp backlighting modules. One embodiment of a lamp backlighting module includes a lamp suspended in a cavity behind a liquid crystal display matrix and enclosed within a chassis. This embodiment does little to dissipate the heat generated by the lamp. As a result, the lamp may be prone to become excessively hot.

Another embodiment of a lamp backlighting module includes a lamp bonded to a lamp housing. In this embodiment, a portion of the heat generated by the lamp may be dissipated through the lamp housing. In order to achieve maximum heat transfer through the lamp housing, the lamp may be bonded along its entire length to the lamp housing by a heat transfer medium such as a thermally conductive adhesive. In addition, the lamp housing may be comprised of a thermally conductive material such as aluminum or any other material having heat transfer characteristics similar to aluminum. The lamp housing may also have fins, flanges, or other protrusions which are adapted to dissipate the heat generated by the lamp. Nevertheless, the lamp may still be prone to become excessively hot in this embodiment since only a portion of the heat is dissipated through the lamp housing.

It is known to ventilate the chassis of a liquid crystal display in order to further dissipate the heat generated by the lamp. However, the air flow through the vents alone may not be sufficient to maintain the lamp at its optimal temperature. It is also known to use fans to cool lamps, but the fans are constantly on in some devices which can cause other problems discussed hereinafter. Consequently, a need exists for an improved method for cooling a lamp backlighting module of a liquid crystal display.

In light of the shortcomings of known cooling methods, there is a need to provide an improved method for cooling a lamp backlighting module. A need also exists to effectively dissipate the heat generated by a lamp backlighting module without compromising the viewing angle or backlighting of a liquid crystal display. It is a further need to use a fan to efficiently dissipate the heat generated by a lamp backlighting module. It is yet another need to utilize a microprocessor to turn on the fan only when necessary to dissipate heat generated by a lamp backlighting module. Finally, there is a need to control the temperature of a lamp backlighting module in order to achieve constant optimal luminance for a given power input.

The present invention satisfies one or more of these needs by providing an improved method for cooling a lamp. The present invention will be described primarily with regard to a method for cooling a lamp backlighting module of a liquid crystal display. However, it should be recognized that the method of the present invention may be used to cool practically any lamp. It should also be recognized that the method of the present invention may be used to cool practically any type of lamp backlighting module of any type of display. In fact, it is preferred that the method of the present invention be used in conjunction with a lamp backlighting module that includes a lamp which is bonded to a lamp housing.

In general, a preferred method of the present invention begins by providing a predetermined power input to a lamp. As power is provided to the lamp, the temperature of the lamp is monitored. When the temperature of the lamp rises to a first predetermined temperature, one or more fans are turned on which are adapted to dissipate the heat generated by the lamp. After the fan(s) cool the lamp to a second, lower predetermined temperature, the fan(s) are turned off.

By using a fan to dissipate heat generated by a lamp backlighting module, the present invention may maintain the temperature of the lamp within a desired range. As a result, the present invention preferably increases the reliability and performance of the liquid crystal display. In particular, a preferred embodiment of the present invention minimizes the power necessary to achieve optimal luminance, and it enables the lamp to constantly produce optimal luminance for a constant power input. It also increases the reliability of the lamp, and it reduces the risk of fire.

In addition to the novel features and advantages mentioned above, other objects and advantages of the present invention will be readily apparent from the following descriptions of the drawings and preferred embodiments.

BRIEF DESCRIPTION OF THE DRAWINGS

FIG. 5 is a bottom plan view of the avionic instrumentation display unit of FIG. 3 (the bottom of the chassis is not shown for clarity);

FIG. 6 is a side elevational view of the avionic instrumentation display unit of FIG. 3; and FIG. 7 is a cross sectional view of the fan housing of the avionic instrumentation display unit of FIG. 3 (the aft of the fan housing is not shown for clarity).

DETAILED DESCRIPTION OF PREFERRED EMBODIMENT(S)

The present invention is directed to a method for cooling a lamp backlighting module of a liquid crystal display. By using at least one fan to dissipate the heat generated by a lamp backlighting module, the temperature of the lamp may be maintained within a desired range. Within the desired temperature range, it is preferred that the lamp constantly produces optimal luminance for a predetermined power input. As a further result of maintaining the temperature of the lamp within a desired range, the reliability and performance of the lamp backlighting module and the other heat-sensitive components of the liquid crystal display are preferably increased without compromising the viewing angle or the backlighting of the display.

Any conventional means (e.g., a thermocouple or other heat sensor) may be used to monitor the temperature of a lamp. It should be recognized that the desired temperature range of a lamp will vary according to the type of lamp, the power input to the lamp, the application of the lamp, and the particular desires of the user. The desired temperature range is preferably the range of temperatures at which a particular lamp constantly produces optimal luminance for a particular power input and application. However, it should be recognized that a user may arbitrarily select a desired temperature range.

Figure 1:
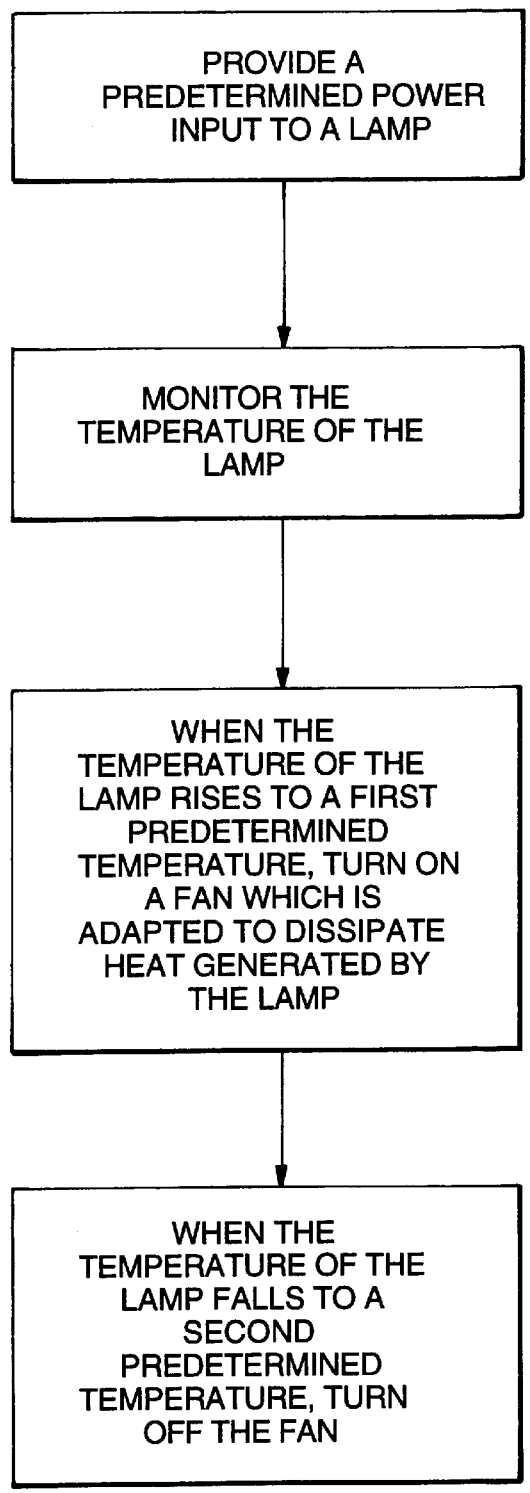
FIG. 1 is a flow chart of the steps of a preferred method of the present invention.

FIG. 1 is a flow chart of a preferred method of the present invention. As illustrated in FIG. 1, a preferred method may begin by providing a predetermined power input to a lamp. As power is provided to the lamp, the temperature of the lamp is monitored. When the temperature of the lamp rises to a first predetermined temperature, a fan is turned on which is adapted to dissipate the heat generated by the lamp. After the fan cools the lamp to a second predetermined temperature, the fan is turned off. The process may be repeated when the temperature of the lamp rises again to the first predetermined temperature.

Figure 2:
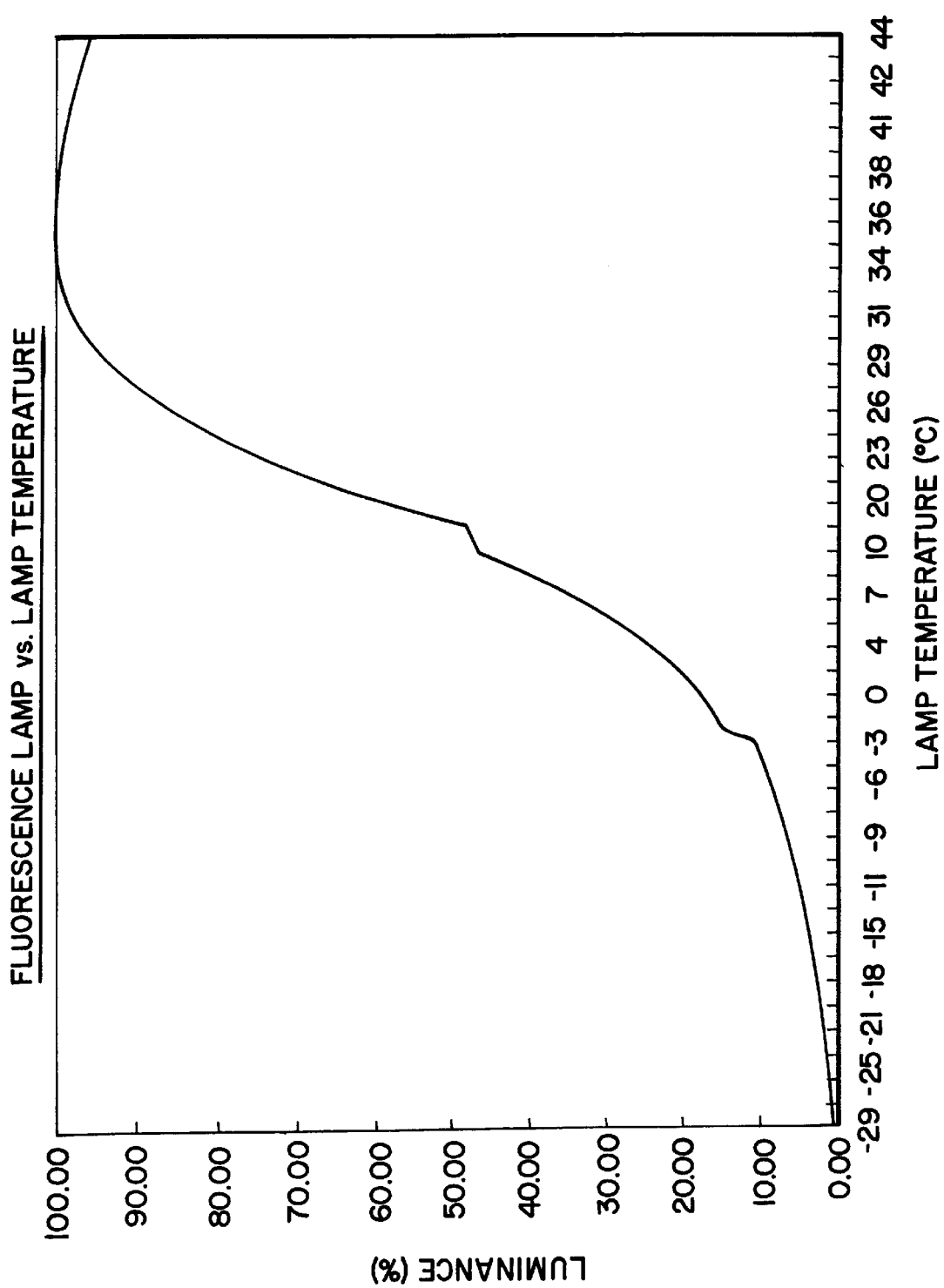
FIG. 2 is a graph of fluorescent lamp luminance versus lamp temperature for a preferred embodiment of a liquid crystal display.
Figure 3:
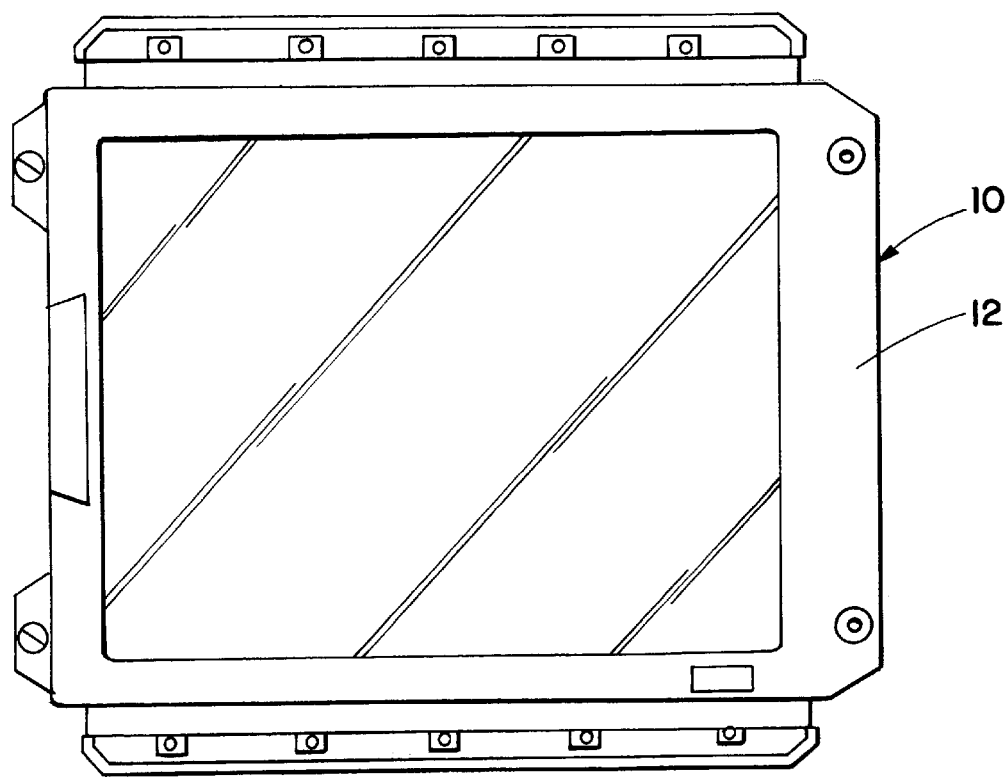
FIG. 3 is a front plan view of one embodiment of an avionic instrumentation display unit which may employ a preferred method of the present invention.
Figure 4:
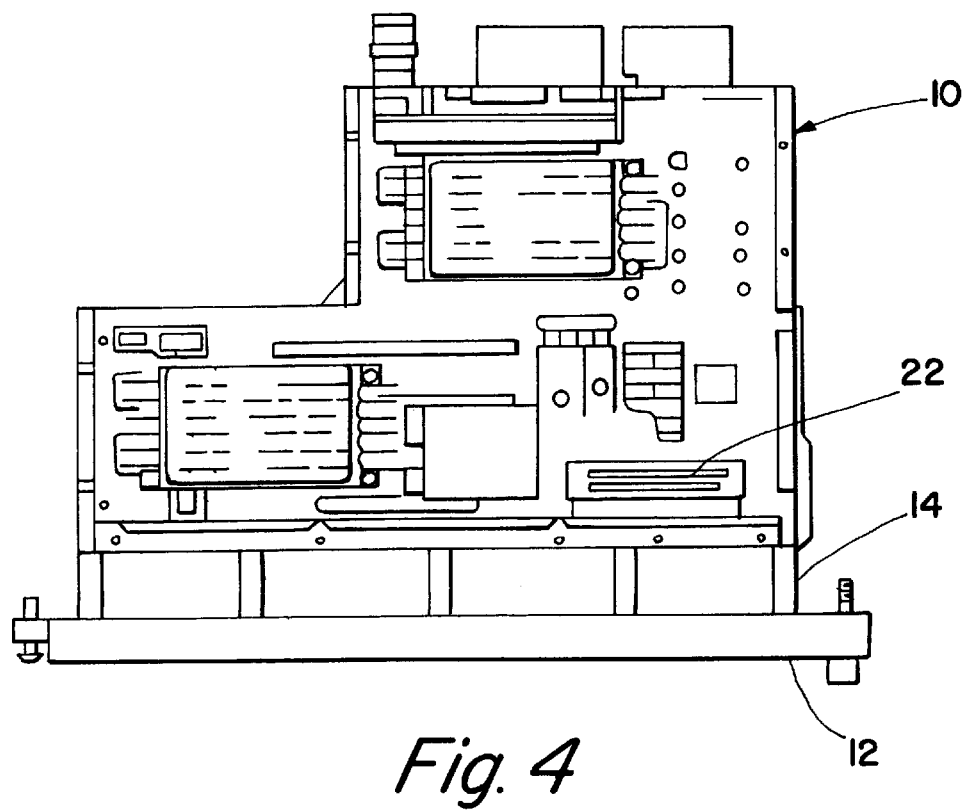
FIG. 4 is a top plan view of the avionic instrumentation display unit of FIG. 3 (the top of the chassis is not shown for clarity)

FIG. 2 is a graph of fluorescent lamp luminance versus lamp temperature for a given lamp of a liquid crystal display. In this example, the lamp temperature is remotely monitored by a temperature sensor located near the lamp on the display interface flex of the liquid crystal display. As used herein, lamp temperature shall include the temperature which is read by a remotely located temperature sensor or any other type of temperature measurement device. Based on FIG. 2, a user may determine that the lamp produces optimal luminance for a predetermined power input when the lamp temperature (as remotely measured by the temperature sensor) is between 33 and 37.5 degrees Celsius. Accordingly, a user may determine that the desired temperature range for this lamp is between 33 and 37.5 degrees Celsius.

Using the data provided by FIG. 2, the method of the present invention may be used to maintain the lamp temperature between about 33 and about 37.5 degrees Celsius. For example, as power is provided to the lamp, the temperature sensor on the display interface flex may be used to remotely monitor the temperature of the lamp. When the lamp temperature rises to about 37.5 degrees Celsius, a fan may be turned on by electronic command from microprocessor-based control circuitry that is in communication with the temperature sensor. The fan is adapted to dissipate the heat generated by the lamp. The temperature sensor may continue to monitor the temperature of the lamp, and the fan is preferably left on until the lamp temperature falls to about 33 degrees Celsius. After the fan cools the lamp to about 33 degrees Celsius, the fan may be turned off by electronic command from the microprocessor-based control circuitry. The fan preferably remains off until the lamp temperature returns to about 37.5 degrees Celsius. When the lamp temperature rises again to about 37.5 degrees Celsius, the fan may be turned back on, and the process repeated.

In light of the above example, the method of the present invention preferably maintains the lamp within the temperature range at which it produces optimal luminance for a constant, minimal power input. As a result, the power input to the lamp preferably does not have to be increased to achieve optimal luminance. In addition, the present method preferably minimizes the power provided to the fan(s) by only running the fan(s) when the lamp temperature falls outside of a desired range.

Unnecessary power results in greater heat within the unit and perhaps lower luminance levels from the lamps. In the above example, if the lamp is powered to a temperature above 37.5 degrees Celsius, any such additional power may be wasted since luminance may actually decrease above this temperature. On the other hand, if cooling is accomplished for too long, decreasing the temperature of the lamp below 33 degrees Celsius, additional power may necessary to once again achieve optimal luminance. Accordingly, power needs to drive the fans and lamps may both be optimized by the present invention.

FIGS. 3 through 6 illustrate one embodiment of an avionic instrumentation display unit which may employ the method of the present invention. The avionic instrumentation display unit 10 generally includes a bezel 12, a lamp backlighting module 14, a chassis 16, a fan housing 18, a motherboard 20, a display interface flex 22, and vent holes 24. As shown in this embodiment, the lamp backlighting module 14 may be located between the bezel 12 and the chassis 16. In addition, FIGS. 3 through 6 show that numerous other heat-sensitive components may be located in close proximity to the lamp backlighting module 14. As a result, the present invention may improve the performance and reliability of the other heat sensitive components as well.

FIG. 7 is a cross sectional view of the fan housing 18 along the line A–A of FIG. 5. In this embodiment, the fan housing 18 houses fans 26, 28. The fans 26, 28 are adapted to draw air through the vent holes 24. The fans then propel the air in the direction of arrow B toward the lamp backlighting module 14.

Although not visible in the figures, the portions of the lamp backlighting module 14, the fan housing 18, and the other components in the airflow path of the fans may have smooth, curved edges and profiles. Smooth, curved edges and profiles preferably help to minimize changes in the air pressure when the fans cool the lamp. A change in air pressure may adversely affect the performance of the lamp. In particular, a significant air pressure drop may diminish the luminance of the lamp.

In the embodiment of the avionic instrumentation display unit shown in FIGS. 3 through 6, the temperature of the lamp is remotely measured by a temperature sensor located on the display interface flex 22. It should be recognized that the accuracy and reliability of the lamp temperature reading may decrease as the distance increases between the temperature sensor and the lamp. Therefore, it is preferred to position the temperature sensor as near to the lamp as possible taking into account the engineering specifications and limitations of the temperature sensor.

For the embodiment shown in FIGS. 3 through 6, the temperature sensor is in electrical communication with microprocessor-based control circuitry. The microprocessor-based control circuitry may be conventional circuitry which is well known to those of ordinary skill in the art. The microprocessor-based control circuitry may be located on the motherboard 20. The microprocessor-based control circuitry is also in electrical communication with the fans. The microprocessor-based control circuitry is preferably adapted to turn on the fans when the temperature sensor reads a first predetermined temperature. When the temperature sensor reads a second predetermined temperature, the microprocessor-based control circuitry is preferably adapted to turn off the fans. In this manner, the microprocessor-controlled method maintains the temperature of the lamp within a desired temperature range for optimal luminance. However, it should be recognized that any conventional means or circuitry may be used to control the operation of the fans.

The preferred embodiments herein disclosed are not intended to be exhaustive or to unnecessarily limit the scope of the invention. The preferred embodiments were chosen and described in order to explain the principles of the present invention so that others skilled in the art may practice the invention. Having shown and described preferred embodiments of the present invention, those skilled in the art will realize that many variations and modifications may be made to affect the described invention. Many of those variations and modifications will provide the same result and fall within the spirit of the claimed invention. It is the intention, therefore, to limit the invention only as indicated by the scope of the claims.

What is claimed is:

1. A method for cooling a lamp, said method comprising:
   determining a first temperature and a second temperature between which desired performance is obtained from said lamp;
   monitoring the temperature of said lamp;
   turning on at least one fan when the temperature of said lamp rises to about said first temperature, said at least one fan adapted to dissipate the heat generated by said lamp; and
   turning off said at least one fan when the temperature of said lamp falls to about said second temperature.

2. The method of claim 1 wherein optimal luminance is achieved for a predetermined power input to said lamp when the temperature of said lamp is substantially maintained between said first temperature and said second temperature.

3. The method of claim 1 wherein desired luminance is achieved for a predetermined power input to said lamp when the temperature of said lamp is substantially maintained between said first temperature and said second temperature.

4. A method for cooling a lamp, said method comprising:
   providing a predetermined power input to said lamp;
   monitoring the temperature of said lamp;
   turning on at least one fan when the temperature of said lamp rises to a first predetermined temperature, said at least one fan adapted to dissipate the heat generated by said lamp; and
   turning off said at least one fan when the temperature of said lamp falls to a second predetermined temperature;
   wherein desired performance is obtained from said lamp when the temperature of said lamp is maintained approximately between said first predetermined temperature and said second predetermined temperature.

5. The method of claim 4 wherein optimal luminance is obtained from said lamp for said predetermined power input when the temperature of said lamp is maintained approximately between said first predetermined temperature and said second predetermined temperature.

6. A method for cooling a lamp, said method comprising:
   determining a desired temperature range for said lamp within which desired performance is obtained from said lamp;
   providing a temperature sensor adapted to monitor the temperature of said lamp;
   monitoring the temperature of said lamp;
   providing a microprocessor in communication with said temperature sensor;
   providing at least one fan in communication with said microprocessor, said microprocessor adapted to turn said at least one fan on and off;
   turning on said at least one fan when the temperature of said lamp rises to a first predetermined temperature, said at least one fan adapted to dissipate the heat generated by said lamp, said first predetermined temperature within said desired temperature range; and
   turning off said at least one fan when the temperature of said lamp falls to a second predetermined temperature, said second predetermined temperature within said desired temperature range.

7. The method of claim 6 wherein said lamp produces optimal luminance when the temperature of said lamp is substantially maintained within said desired temperature range.

\* \* \* \* \*